Nov. 7, 1950  C. J. ENGSTROM  2,528,950
SEAT CUSHION COVER CONSTRUCTION
Original Filed Sept. 13, 1945  3 Sheets-Sheet 1
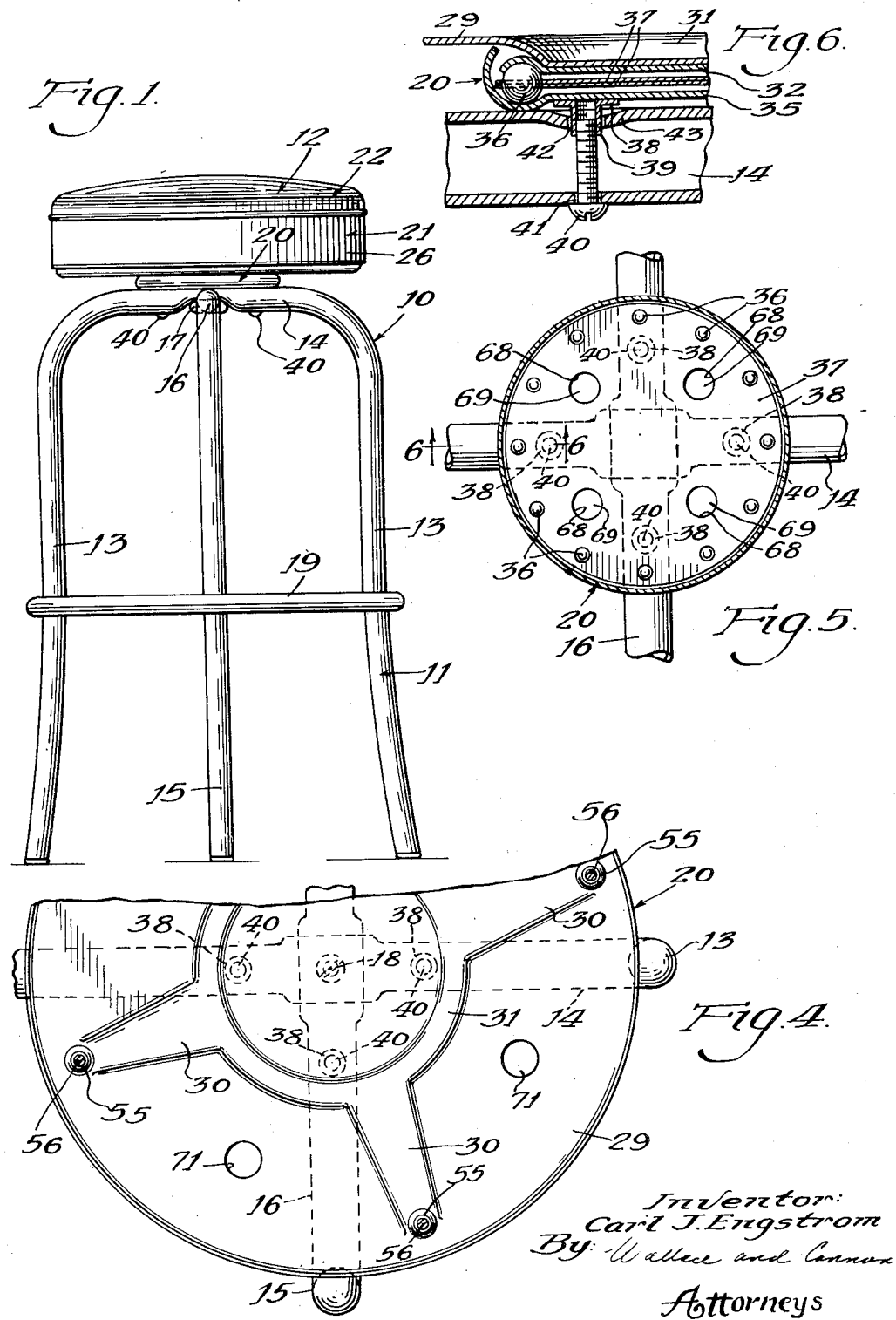
Inventor:
Carl J. Engstrom
By: Wallace and Connor
Attorneys

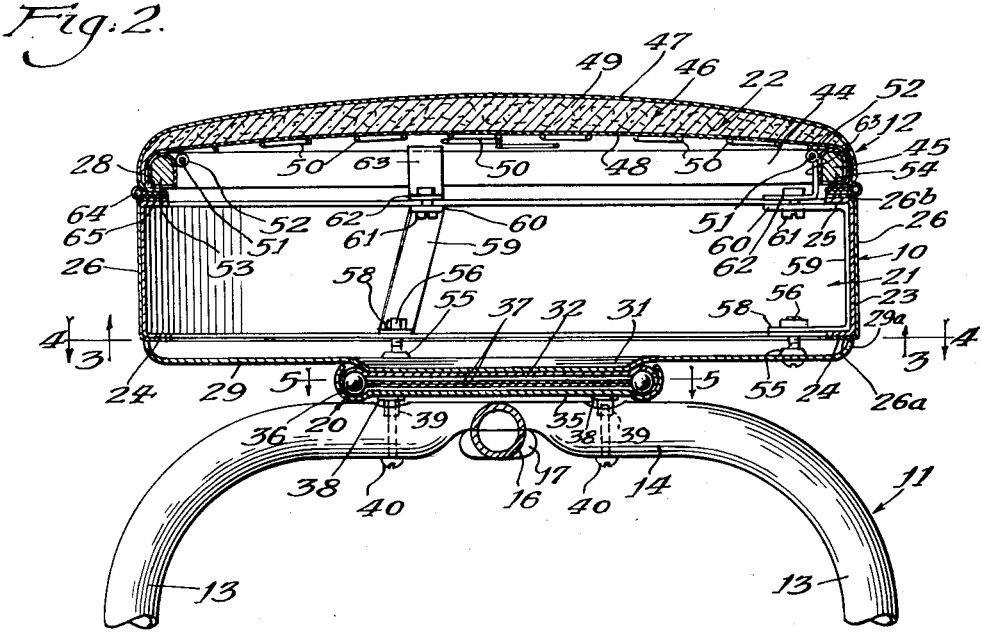
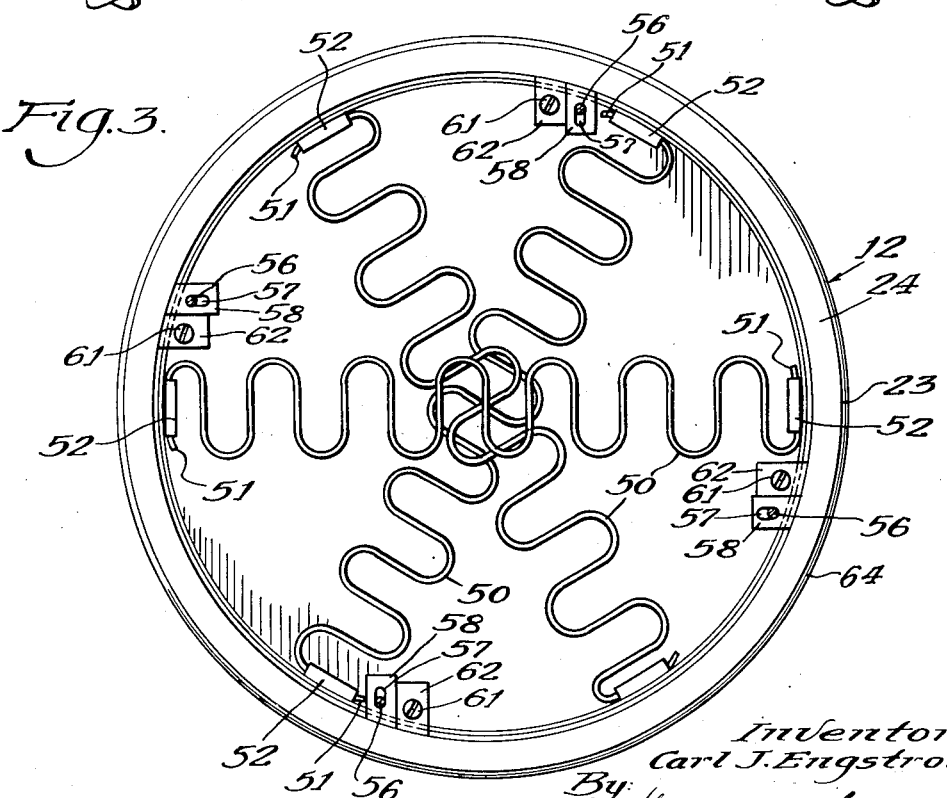

Nov. 7, 1950

C. J. ENGSTROM 2,528,950

SEAT CUSHION COVER CONSTRUCTION

Original Filed Sept. 13, 1945

Inventor:
Carl J. Engstrom
By Wallace and Cannon
Attorneys

Patented Nov. 7, 1950

2,528,950

UNITED STATES PATENT OFFICE 2,528,950

SEAT CUSHION COVER CONSTRUCTION

Carl J. Engstrom, Michigan City, Ind., assignor to Royal Metal Manufacturing Company, Chicago, Ill., a corporation of Illinois Original application September 13, 1945, Serial No. 616,039. Divided and this application June 13, 1947, Serial No. 754,465

4 Claims. (Cl. 155—184)

This application is a division of my copending application, Serial No. 616,039, filed September 13, 1945, on "Furniture Construction."

This invention relates to furniture construction and, more particularly, the present invention relates to a stool and particularly to a revolving stool such, for example, as a bar stool, although certain phases of the invention are also applicable to other articles of furniture including so-called counter or pedestal stools, store stools, kitchen stools and the like.

Bar stools and counter or pedestal stools heretofore made and used have been subject to a number of difficulties. Thus, the cushions of such bar stools have customarily been made with so-called Marshall springs and by reason of this fact, it has been necessary to extend the upholstery fabric all the way down the sides of the seat cushion so as to enclose the springs. However, bar stools are subjected to hard usage and as the prior art bar stools were used, the springs sagged as a result of use, and the upholstery fabric would crease and eventually wear out. In order to replace the upholstery fabric on such prior art bar and like stools, it was necessary to replace completely the upholstery fabric on the entire seat cushion and this operation was relatively expensive from the standpoint of time and labor as well as material involved.

A primary object of my invention is to provide a novel seat construction embodied in a new stool.

An additional object of the invention is to provide in the new stool a novel seat construction embodying a seat cushion base which is covered with an upholstery fabric mounted thereon and which is subjected to relatively little wear in use, and a seat cushion detachably attached to the seat cushion base and so constructed that when the upholstery on the seat cushion becomes worn in use, it may readily be replaced without detaching the upholstery fabric from the seat cushion base.

A further object of the invention is to provide a novel construction for fastening the upholstery fabric on the seat cushion and for enabling the upholstery fabric on the seat cushion to be removed and replaced as and when necessary.

Still another object of the invention is to provide a novel construction for detachably interconnecting the base of the new stool and the seat cushion base embodied therein.

An additional object of the invention is to provide a novel construction for detachably interconnecting the base of the seat cushion and the upholstered seat cushion so that as the upholstery fabric on the seat cushion becomes worn, the seat cushion may readily be detached from the seat cushion base, the upholstery fabric on the seat cushion replaced, and the thus reupholstered seat cushion then replaced in position of use upon the seat cushion base.

A further object of the invention is to provide in the new stool a seat construction which may be embodied not only in stools of the revolving type, but also in stools of the non-revolving seat type.

Other objects of the present invention will be apparent from the following description and claims and are illustrated in the accompanying drawings which, by way of illustration, show preferred embodiments of the invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings,

Fig. 1 is a side elevational view of a bar stool embodying the present invention.

Fig. 2 is an enlarged central sectional view showing the construction of the seat of the new stool and the construction of the novel anti-friction bearing assembly for rotatably mounting the seat upon the supporting frame or base of the new stool, only a part of the supporting frame or base of the stool being shown;

Fig. 3 is a bottom plan view of the seat of the new stool, on line 3—3 in Fig. 2;

Fig. 4 is a top plan view on line 4—4 in Fig. 2 showing the construction of the annular plate or pan which forms the bottom wall of the seat and by means of which the seat is attached to the anti-friction bearing assembly;

Fig. 5 is a sectional plan view on line 5—5 in Fig. 2 illustrating the construction of the anti-friction bearing assembly which is embodied in the new stool for rotatably mounting the seat thereof upon its supporting frame;

Fig. 6 is an enlarged sectional detail view on line 6—6 in Fig. 5 illustrating the construction of the anti-friction bearing assembly for interconnecting the seat and the supporting frame of the new stool; this figure also illustrating the novel manner in which the anti-friction bearing assembly is connected to the supporting frame or base of the new stool;

Figure 7:
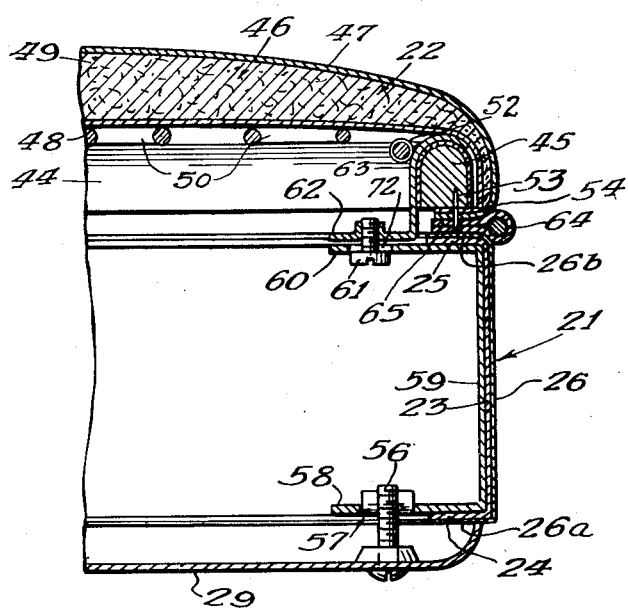
Fig. 7 is an enlarged sectional detail view of the seat embodied in the new stool.
Figure 8:
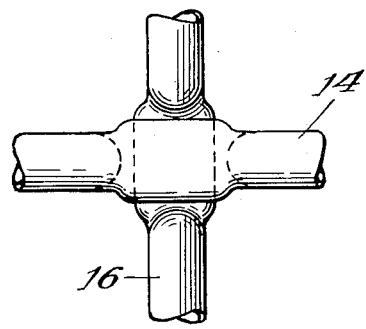
Fig. 8 is a detail plan view of the central portion of the top of the base of the stool, showing the crossed relationship of the legs thereof.
Figure 9:
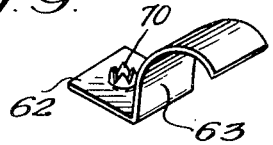
Fig. 9 is a detail view illustrating a reinforcing member which is embodied in the seat of the new stool.
Figure 10:
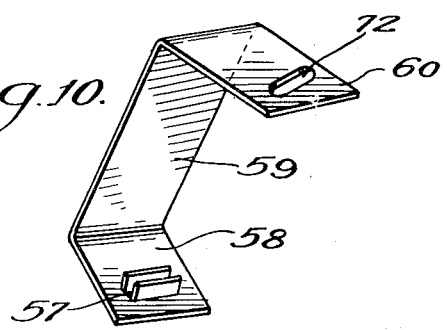
Fig. 10 is a detail perspective view of an attaching member embodied in my device.

A typical and preferred embodiment of the present invention, in the form of a bar stool embodying a revolving seat, is illustrated in the drawings, wherein it is generally indicated at 10, and comprises a supporting base or supporting frame, which is generally indicated at 11, and a seat which is generally indicated at 12. The supporting base or frame 11 of the new stool comprises two pairs of tubular metal legs 13 and 15, respectively, which may be formed of suitable pieces of U-shaped metal interconnected at their upper end portions in the manner discussed in greater detail in my aforementioned co-pending application, Serial No. 616,039.

An anti-friction bearing unit or assembly 20 which includes a plurality of balls 36 disposed in retainer plates 37 between upper and lower plates or raceways 32 and 35, respectively, Fig. 2 and 6, is mounted on the cross pieces 14 and 16 of the tubular legs 13 and 15, respectively, and is connected thereto by bolts 40 extending through openings 41 and 42 in the cross pieces 14 and 16 and threadedly engaged with T-nuts 38 mounted on the lower face of the lower raceway 35, as is discussed in greater detail in my aforementioned co-pending application, Serial No. 616,039.

The supporting base or frame 11 of the new bar stool is completed by an annular metal retaining member or bracing ring 19 which encircles the tubular metal legs 13 and 15 and which may be secured thereto by means of suitable fastening elements such as bolts or the like.

The seat 12 of the new bar stool 10 is of the revolving type, being rotatably mounted upon and secured to the supporting base or frame 11 by means of the anti-friction bearing unit or assembly 20, and comprises, in general, a seat cushion base 21 which is mounted on the anti-friction bearing unit or assembly 20 and an upholstered seat cushion 22 which is detachably mounted on the seat cushion base 21 of the seat 12.

The seat cushion base 21 of the seat 12 includes a metallic frame member 23, which is preferably formed of shaped steel, and which is preferably but not necessarily annular in form since it may be made in other shapes or forms, depending upon the shape desired in the seat of the new stool. The annular metallic frame member 23 of the seat 12 has an inwardly extending horizontal annular flange 24 formed thereon at the bottom thereof and said annular frame member 23 also has an inwardly extending annular horizontal flange 25 formed thereon at the upper end thereof (Fig. 2 and 7). The outer surface of the vertical sidewall of the annular metallic frame member 23 of the seat cushion base 21 and the outer surfaces of the top and bottom flanges 25 and 24 on the member 23 are covered by a piece of suitable upholstery fabric 26 which may be secured to the annular frame member 23 of the seat cushion base 21 in any suitable manner. Thus the upholstery fabric 26 may be sewed into the form of a ring or other proper shape necessary to fit the member 23 with a portion 26a of the fabric covering 26 extending under the lower flange 24 of the member 23 and with a portion 26b of the fabric covering 26 extending over the upper flange 25 of the member 23. When the fabric covering 26—26a—26b is then drawn tight or taut to member 23, it is held in that position by the clamping engagement of the upturned marginal edge 29a of the bottom wall or pan 29 of the seat against the lower edge portion 26a of the fabric covering 26 and by the clamping engagement of the annular ring 45 of the seat cushion upon the upper edge portion 26b of the fabric covering 26, as will be described more fully hereinafter.

A plurality of flat steel reinforcing members 59 are welded to the metallic frame or ring 23 of the seat cushion base 21 on the inner side of said annular member 23. Each of these reinforcing members 59 has a horizontally extending arm 58 at its lower end and each reinforcing member 59 has a laterally extending arm 60 at its upper end. Each of the lower arms 58 is provided with an oblong broached opening or slot 57 for the reception of a fastening bolt 56 (Fig. 3) and each of the upper arms 60 is provided with an oblong opening or slot 72 for the reception of a fastening bolt 61, for reasons which will be described more fully hereinafter.

The seat cushion base 21 of the seat 12 embodies a steel bottom plate or pan 29 which is attached to the annular member 23 of the seat base 21 and to the anti-friction bearing unit or assembly 20 in a manner which will be described presently. As shown in Fig. 4, this bottom plate or pan 29 is provided with a radially arranged series of depressed reinforcing ribs 30 which are formed integrally therein and which extend radially outwardly from a depressed annular center portion or reinforcing ring 31 also formed integrally in the bottom plate 29 (Figs. 4 and 6).

The depressed central portion 31 of the bottom wall or pan 29 of the seat 21 is attached in any suitable manner, as by spot welding, to the upper plate or raceway 32 of the anti-friction bearing unit 20.

The lower raceway plate 35 in the anti-friction bearing assembly or unit 20 is provided with an annular row of radially arranged openings 69 and each of the ball retainer plates or discs 37 is provided with a similar annular row of radially arranged openings 68, the openings 68 and 69 being disposed in alignment or registry with each other to enable a welding tool or electrode to be inserted therethrough so as to spot weld the uppermost raceway plate 32 to the depressed central portion 31 of the bottom pan or plate 29 of the seat 12.

In order to attach the base plate or bottom pan 29 of the seat 12 to the annular member 23, which is embodied in the seat 12, countersunk or depressed bolt holes 55 are formed in the bottom plate or pan 29 and bolts 56 are extended upwardly through these openings or holes 55 in the pan 29 and through the broached oblong holes or openings 57 which are formed in the lower arms 58 of the combination reinforcing and attaching members 59. It will be understood, in this connection, that each of the bolts 56 has threaded engagement with the wall defining the broached oblong opening 57 through which it is extended. The upper end portion of each of the bolts 61 is screwed into a threaded opening 70 formed in a raised boss provided on the lower arm 62 of an L-shaped attaching member or lug 63. These attaching members or lugs 63 are secured in any suitable manner, as by welding, to annular metal member or ring 44 which is embodied in and forms the frame of the cushion unit 22 of the seat 12.

As shown in Figs. 2 and 7, the upper and lower arms 60 and 58, respectively, of the members 59 are offset laterally from each other so that the main extent of each member 59 extends at an acute angle to the vertical relative to and across the inner surface of the annular metal frame 23 of the seat cushion base 21 of the seat 12 to which the members 59 are welded. Hence the members 59 function as attaching members, cooperating with the bolts 56 to fasten the pan or bottom plate 29 of the seat to the lower flange 24 of the annular frame member 23, and cooperating with the bolts 61 and the attaching lugs 63—62 to attach the seat cushion unit 22 to the annular frame member 23 of the seat cushion base 21 of the seat 12. It will likewise be noted that the members 59 also function to reinforce the vertical side wall of the annular frame member 23 of the seat cushion base 21 of the seat against bending and other stresses which may be exerted thereon as, for example, when the new stool is tipped over.

The annular metal frame member 44 of the seat cushion unit 22 is substantially U-shaped or channel-shaped in cross section, being closed at its upper side and open at its lower side, as shown in Fig. 2. An annular wooden insert or ring 45, shaped to fit the annular frame member 44, is fitted into the channel-shaped annular frame member 44 and an upholstered cushion 46 is mounted on the annular metal frame member 44. The upholstered cushion 46 includes a casing composed of an upper layer 47, which may be composed of any suitable upholstery fabric, a lower fabric layer 48 of burlap or other suitable fabric, and a mass or body of suitable resilient cushion-stuffing or cushion-forming cotton or other suitable cushion-forming material 49. The cushion unit 22 of the seat 12 also embodies a plurality of flat sinuous metal wire springs 50 upon which the burlap or like fabric sheet 48 of the seat cushion 46 is laid. The end portions 51 of these springs 50 are inserted through tubular metal sleeves 52 which may be made separate from and secured in any suitable manner, as by soldering, to the annular metal frame 44 of the seat cushion unit 22, on the inner side of said member 44. If desired, however, the tubular members 52 may be formed integrally with the metal frame member 44 of the seat cushion unit 22. To complete the seat cushion unit 22 of the seat 12 the lower marginal edge portion 53 of the upholstery fabric 47 of the seat cushion unit 46 is extended under the wooden insert or ring 45 and is secured thereto in any suitable manner as by tacking the said inwardly extended marginal edge portion of the upholstery fabric 47 of the seat cushion unit 22 to the wooden ring 45 on the bottom side thereof. (Figs. 2 and 7).

An ornamental upholstery welt 64, provided with a fabric covering 65, is extended around and is fastened in position of use below the lower marginal edge portion of the upholstery fabric 47 of the seat cushion unit 22, as will be described hereinafter. The fabric 65, which encloses the welt 64, lies between the upper marginal edge 26b of the upholstery covering on the upper flange 25 of the annular metal frame member 23 and the inturned marginal edges of the upholstery fabric 47 on the seat cushion unit 22.

The various parts or units of the new bar stool may be assembled and interconnected substantially as follows:

The base flanges 38 of the T-nuts 39 may be welded or otherwise fastened to the lower raceway plate 35 on the bottom side thereof. The anti-friction bearing assembly or unit 20 may then be assembled by arranging the two ball retainer plates or discs 37, with the anti-friction elements or balls 36 disposed therein, between the upper and lower raceway plates 32 and 35, respectively, and then securing the plates 32 and 35 together, as discussed in greater detail in my aforementioned co-pending application, Serial No. 616,039.

The anti-friction bearing assembly or unit 20 may then be mounted upon the supporting base or frame 11 by arranging the flattened portion 17 of each of the cross pieces 14 and 16 of the tubular legs 13 and 15, respectively, in nested relationship with the recessed portion of the other cross piece, as in Fig. 2, and with the threaded stems or shanks of the T-nuts 39 projecting downwardly through the holes 42 in the cross pieces 14 and 16 of the tubular metal legs 13 and 15, respectively. The bolts 40 may then be inserted through the openings 41 in the lower walls of the cross pieces 14 and 16 and then screwed into the internally threaded T-nuts 39 previously welded to the lower raceway plate 35 of the anti-friction bearing assembly or unit 20. In this manner the anti-friction bearing assembly or unit 20 may be mounted upon and attached to the tubular metal supporting frame 11 of the new stool while, at the same time, the tubular metal legs 13 and 15 and the cross pieces 14 and 16, respectively, thereof are firmly secured together.

The base plate or bottom pan 29 of the seat 12 may then be attached to the anti-friction bearing assembly or unit 20 by arranging the central depressed portion 31 of the base plate or pan 29 over the upper surface of the upper raceway plate 32 of the anti-friction bearing assembly 20 and then spot welding the upper raceway plate 32 of the anti-friction bearing assembly 20 to the base plate or bottom pan 29 of the seat 12. This may be accomplished by inserting a welding electrode through the registered openings 69 and 68 in the lower raceway plate 35 and in the ball retainer discs 37, respectively.

The combination reinforcing and attaching members 59 may be attached to the annular member 23 by the seat base 21, and on the inner surface of said annular member 23, by welding the members 59 to the member 23.

The upholstery fabric covering 26—26a—26b may then be slipped over the annular metal frame member 23 of the seat cushion base 21, on the outer side of said member 23 with the portion 26b of the said upholstery fabric covering 26 extended over the upper surface of the upper flange 25 of the member 23 and with the lower portion 26a of the upholstery fabric covering 26 extended under the lower flange 24 of the annular frame member 23 of the seat 12.

The springs 50 may be attached in position of use by inserting the end portions 51 thereof through the metal tubular sleeves 52 and then bending the said end portions slightly (Fig. 3) so as to prevent their withdrawal from the tubular metal sleeve 52. The tubular metal sleeve 52, with the end portions 51 of the springs 50 extended therethrough, may then be welded or soldered or otherwise suitably attached to the annular channel-shaped frame 44 of the seat cushion unit 22 and on the inner surface of said member 44.

The wooden filler and upholstery anchor ring 45 may then be inserted into the channel-shaped annular frame member 44 of the seat cushion unit 22, whereupon the burlap sheet 48 may be laid over the springs 50, the resilient cushion-forming material 49 laid on the burlap sheet 48, and the upholstery fabric 47 laid thereover. The marginal edge portion of the upholstery fabric cover 47 of the seat cushion unit 22 may then be extended under the bottom edge of the wooden insert 45 and secured to the latter in any suitable manner as by means of upholstery tacks inserted through the inturned marginal edge portion of the upholstery fabric covering 47 of the cushion casing into the said combination wooden filler and upholstery anchor ring 45.

The annular fabric cover 65 for the ornamental upholstery welt 64 may then be laid over the upper marginal edge portion 26b of the upholstery cover 23 on the upper flange 25 of the annular member 23 of the seat cushion base 21 whereupon the assembled seat cushion unit 22 may then be laid upon the fabric cover 65 of the welt 64. The seat cushion unit 22 of the seat 12 and the base 21 of the seat 12 may then be assembled by inserting the bolts 61 into position of use, this being accomplished by inserting the bolts 61 through the oblong slots or holes 72 in the upper arms 60 of the reinforcing members 59 and through the threaded openings 70 in the lower arms 62 of the anchoring legs 63 which are welded to the annular channel-shaped metal frame 44 of the seat cushion unit 22. This operation of inserting the bolts 61 in position of use is performed prior to the time the bottom plate or pan 29 of the seat 12 is attached in position of use.

Hence, it will be seen that the last operation involved in assembling the new stool is to mount the assembled seat cushion unit 22 of the base 21 of the seat 12 upon the base plate or bottom pan 29 of the seat 12, it being understood that the depressed central portion 31 of the base plate or bottom 29 of the seat base 21 has previously been spot welded to the upper raceway plate 32 of the anti-friction bearing unit or assembly 20. This final operation of attaching the base plate or bottom pan 29 of the seat to the assembled seat cushion 22 and seat base 21 is accomplished by inserting the bolts 56 through the openings 55 in the base plate or bottom pan 29 and through the broached oblong openings 57 in the arms 58 of the members 59.

It will be noted, in this connection, that the broached oblong openings or holes 57 in the lower arms 58 of the reinforcing members 59 and the oblong openings 72 in the upper arms 60 of the reinforcing members 59 enable the annular frame member 23 of the seat base 21 to be turned and adjusted slightly circumferentially relative to the seat cushion unit 22 and relative to the bottom plate or pan 29 of the seat 12 and the anti-friction bearing assembly 20 and supporting base or frame 11 of the new stool.

When the seat 12 and the supporting frame or base 11 of the new stool are assembled and interconnected by the anti-friction bearing or assembly unit 20, the seat 12 is free to rotate or revolve readily upon the anti-friction bearing unit 20 or assembly relative to the supporting base or frame 11 and the tubular legs 13 and 15 which are embodied therein. At the same time, a strong and sturdy interconnection is thus effected between the seat 12 and the supporting frame 11 so that when the new stool is subjected to the shocks and stresses and strains to which bar and counter stools and the like are subjected in use, as when rocked or tipped over or otherwise roughly handled, the interconnection thus afforded between the seat 12 and the supporting base 11 effectively resists separation of the seat 12 from the supporting base 11 or loosening of the seat 12 upon the supporting base 11 and thus overcomes one of the difficulties experienced heretofore in the use of prior art bar stools. This arrangement likewise eliminates the concentration of the stresses and strains to which such stools are subjected upon a single interconnecting stem or casting between the seat of the stool and its supporting base as in the prior art and spreads such stresses and strains over a relatively wide area.

It will also be noted that since the upholstery fabric cover 26 on the annular metal frame member or ring 23 is secured thereto in close fitting relationship by the combined clamping action of the upturned marginal edge 29a of the bottom plate 29 on the lower marginal edge portion 26a of the upholstery cover 26 and by the clamping action of the seat cushion unit 22 and the upper marginal edge portion 26b of the upholstery fabric covering 26. Hence there is little, if any, tendency for the upholstery fabric covering 26 on the annular metal frame 23 of the seat cushion base 21 to flex or wrinkle and become loose or worn and, as a result, the upholstery fabric cover 26 requires practically no replacement, and unless cut or otherwise intentionally marred or damaged, will last throughout the life of the new stool itself.

Thus, it will be seen that the only part of the upholstery fabric on the new stool which is subjected to wear and may require replacement is the upholstery fabric cover 47 which is embodied in the seat cushion 46 of the seat 12. Such repair or replacement of the upholstery fabric cover 47 of the seat cushion 46 may readily be effected by detaching the seat 12 of the new bar stool from its supporting base 11. This may readily be accomplished by removing the bolts 56 so as to detach the seat 12 from its supporting base 11 and then detaching the seat cushion unit 22 from the base 21 of the seat 12 by removing the bolts 61. The lower and inner marginal edge portion 54 of the upholstery fabric cover 47 of the seat cushion unit 46 may then be detached from the seat cushion frame 44—45 by removing the upholstery tacks from the wooden ring 45, whereupon the upholstery fabric 47 of the seat cushion unit 22 may be repaired or replaced and the parts of the new stool reassembled in the manner hereinbefore explained.

As will readily be apparent to persons skilled in the art, the construction of the seat cushion base 21 and of the seat cushion unit 22 may be embodied in stools including bar stools, kitchen stools and counter stools and the like which are of the non-revolving seat type, and in such instances the anti-friction bearing assembly 20 could be eliminated without departing from the scope and purview of the present invention.

It will thus be seen that the new bar stool embodies a novel seat embodying a permanently upholstered seat cushion base and an upholstered seat cushion removably mounted thereon and so constructed and arranged that the upholstery and springs of the seat cushion unit may be readily replaced or repaired without necessitating replacement or repair of the upholstery covering on the entire body of the seat itself, as has been necessary heretofore in bar stools and other stools.

It will thus be seen from the foregoing description, considered in conjunction with the accompanying drawings, that the present invention provides a new and improved article of furniture in the form of a stool having the desirable advantages and characteristics, and accomplishing its intended objects, including those hereinbefore pointed out and others which are inherent in the invention.

While the invention has been illustrated and described as applied to a bar stool, it is contemplated that at least certain phases of the invention may take other forms and may be used in other articles of furniture including counter or so-called pedestal stools, display tables, store stools, and the like.

I claim:

1. A stool comprising a supporting base, a seat frame member including an upstanding side wall and an upholstery covering mounted in predetermined position on the outer surface of said side wall and extending over the top and bottom of said frame member and in engagement therewith, a base plate mounted on said supporting base and disposed below said seat frame member in engagement with said upholstery covering, a seat cushion unit mounted on top of said seat frame member in engagement with said upholstery covering, and means releasably securing said seat frame member, said base plate, and said seat cushion unit together in clamping engagement with said upholstery covering to thereby hold the latter in said predetermined position on said side wall.

2. In a stool of the type embodying an upright elongated supporting base, a seat mounted on the upper end of said base, said seat comprising a base plate mounted on said upper end of said supporting base, a seat frame member including a vertically extending side wall and an upholstery cover mounted on the outer surface of the latter, a seat cushion unit including a supporting frame, and a seat cushion mounted on and supported by said supporting frame, said seat cushion including a second upholstery cover having a marginal edge portion disposed below said supporting frame, said seat frame member being disposed between said seat cushion unit and said base plate for supporting said seat cushion unit on the latter, and means releasably securing said base plate, said seat frame member, and said supporting frame together in clamping engagement with said first mentioned upholstery cover and said second upholstery cover to thereby hold said covers on said side wall and seat cushion.

3. A stool comprising a supporting base, a seat cushion unit comprising a horizontally disposed supporting frame including a plurality of clip members disposed in horizontally spaced relation to each other, a plurality of springs connected to and extending between said clip members, and a cushion member mounted on and supported by said springs, said cushion member including padding means mounted on said springs, and a sheet of upholstery material extending across the top of said padding means in predetermined position thereon and having a marginal edge portion extending across a portion of the bottom of said supporting frame, means for supporting said seat cushion unit on said supporting base, and means including said supporting frame for releasably securing said last named means and said seat cushion unit together in clamping engagement with said marginal edge portion of said sheet of upholstery material to thereby hold said sheet in said predetermined position on said padding means.

4. In a stool of the type embodying an elongated supporting base disposed in upright position, a base plate mounted on the upper end of said supporting base in substantially horizontal position, a supporting frame comprising a continuous side wall disposed in upright position, a plurality of brackets mounted on and projecting inwardly from said side wall, and a continuous sheet of upholstery material mounted on the outer surface of said side wall and having marginal edge portions extending horizontally across portions of the top and bottom of said side wall, said supporting frame being disposed on said base plate with said marginal edge portion of said sheet which extends across said bottom of said side wall resting on outer edge portions of said base plate, a seat-top unit mounted on the top of said supporting frame and resting on said marginal edge portion of said sheet which extends across said top of said side wall, and means including said brackets clamping said base plate, said supporting frame, and said seat-top unit together in clamping engagement with said marginal edge portions of said sheet of upholstery material to hold said sheet of upholstery material on said outer surface of said side wall.

CARL J. ENGSTROM.

REFERENCES CITED

The following references are of record in the file of this patent:

UNITED STATES PATENTS

| Number | Name | Date |
|---|---|---|
| 502,069 | Dierdorf | July 25, 1893 |
| 2,061,054 | Wood | Nov. 17, 1936 |
| 2,215,373 | Krakauer | Sept. 17, 1940 |
| 2,261,996 | Haberstump | Nov. 11, 1941 |
| 2,498,837 | Gelman | Feb. 28, 1950 |

FOREIGN PATENTS

| Number | Country | Date |
|---|---|---|
| 151,575 | Great Britain | Sept. 30, 1920 |